(12) United States Patent
Karasik (10) Patent No.: US 7,101,040 B2
(45) Date of Patent: Sep. 5, 2006

(54) APPARATUS AND METHOD FOR RETAINING AND ACCESSING CLIP-ON SUNGLASSES

(76) Inventor: Randal B Karasik, 4625 W. 62st. Pl., Arvada, CO (US) 80003

( * ) Notice: Subject to any disclaimer, the term of this patent is extended or adjusted under 35 U.S.C. 154(b) by 33 days.

(21) Appl. No.: 11/042,950

(22) Filed: Jan. 25, 2005

(65) Prior Publication Data

US 2006/0164595 A1    Jul. 27, 2006

(51) Int. Cl.
*G02C 1/00* (2006.01)
(52) U.S. Cl. .......................... 351/158; 351/47; 24/3.3; 248/309.4
(58) Field of Classification Search ................. 351/44, 351/47, 155, 158; 24/3.1, 3.3, 3.7, 3.8; 248/309.1, 248/309.4
See application file for complete search history.

(56) References Cited

U.S. PATENT DOCUMENTS

| | | | |
|---|---|---|---|
| 2,385,859 A | 10/1945 | Jacobson | 335/285 |
| D146,223 S | 1/1947 | Kalnitz et al. | D3/265 |
| 2,735,597 A | 2/1956 | Treleven | 224/312 |
| 2,770,168 A | 11/1956 | Tesauro | 351/57 |
| 4,000,810 A | 1/1977 | Leblanc | 206/5 |
| 4,290,522 A * | 9/1981 | Takasaki | 206/5 |
| D293,389 S | 12/1987 | Vitaloni | D3/219 |
| 4,867,402 A | 9/1989 | Benson et al. | 248/206.3 |
| D307,822 S | 5/1990 | Marks | D3/265 |
| D310,301 S | 9/1990 | Burrow | D3/265 |
| D329,540 S | 9/1992 | Kunes et al. | D12/417 |
| 5,195,668 A | 3/1993 | Kunes et al. | 224/312 |
| 5,278,591 A | 1/1994 | Trotter | 351/112 |
| 5,372,345 A | 12/1994 | Schmidt | 248/229.16 |
| 5,619,774 A * | 4/1997 | Perry | 24/3.6 |
| 5,642,177 A | 6/1997 | Nishioka | 351/47 |
| 5,676,242 A | 10/1997 | Scott | 206/5 |
| D403,294 S | 12/1998 | Baldwin et al. | D12/417 |
| 6,168,273 B1 | 1/2001 | Dupraz et al. | 351/158 |
| 6,382,482 B1 | 5/2002 | Chao | 224/312 |
| 6,616,274 B1 | 9/2003 | Sabia et al. | 351/158 |

OTHER PUBLICATIONS

"Magic Clip" pictures, Jan. 12, 2005.

* cited by examiner

*Primary Examiner*—Huy Mai
(74) *Attorney, Agent, or Firm*—John R. Ley (57) ABSTRACT

Clip-on sunglasses are retained from a vehicle sun visor and accessed from the sun visor for connection to conventional eyeglasses. A case or pouch may be attached to the sun visor to contain eyeglasses, while the clip-on sunglasses are attached to the exterior of the pouch. Magnetic attraction between a flange of a retainer attached to the sun visor or to the pouch and a slot in a connection body attached to the clip-on sunglasses retains the clip-on sunglasses and permits access to the clip-on sunglasses.

22 Claims, 5 Drawing Sheets

APPARATUS AND METHOD FOR RETAINING AND ACCESSING CLIP-ON SUNGLASSES

This invention relates to clip-on sunglasses which are connected to conventional clear-lens eyeglasses to obtain eye protection against intense sunlight. More particularly, the present invention relates to a new and improved apparatus and method for retaining and accessing the clip-on sunglasses to allow an operator of a vehicle to access the clip-on sunglasses easily and conveniently from a readily-accessible location, among other improvements.

BACKGROUND OF THE INVENTION

Clip-on sunglasses are formed by colored lenses and a frame structure for the colored lenses. Clip-on sunglasses do not include the typical temples which extend from the lens frame structure to behind the ears of a user, as is the case with conventional eyeglasses. Instead, clip-on sunglasses are intended to clip over the front of the clear lenses of conventional eyeglasses, to convert the conventional eyeglasses into sunglasses. When protection from intense sunlight is no longer needed, the clip-on sunglasses are detached from the conventional eyeglasses.

Originally, clip-on sunglasses included a mechanical clip arrangement which mechanically attached the colored lenses and their frame structure to the conventional eyeglasses. A variety of different types of mechanical clip arrangements have been used, including some which permit the clip-on sunglasses to pivot forward from lenses of the conventional eyeglasses. The pivoting movement removes the colored lenses from the line of sight through the clear lenses of the conventional sunglasses, but does not detach the clip-on sunglasses from the conventional eyeglasses. More recently, clip-on sunglasses have been formed with small magnets to hold the clip-on sunglasses to the metallic frame of the eyeglasses. Such magnetic attachments eliminate the need for mechanical clip arrangements and therefore are usually more compact.

The magnetic attachment permits a close fit between the colored lenses of the clip-on sunglasses and the frame of the eyeglasses. Excess space is not consumed by mechanical clip arrangements. The magnetically-connected clip-on sunglasses are more closely positioned with respect to the lenses of the eyeglasses, allowing the colored lenses in the clip-on sunglasses to be shaped to coincide with the shape of the frame structure and the lenses of the conventional eyeglasses. Under these circumstances, the conventional eyeglasses with the magnetically-attached clip-on sunglasses are almost the same in appearance as conventional sunglasses. The similarity in appearance between eyeglasses with magnetically-attached clip-on sunglasses and conventional sunglasses has enhanced stylistic appeal and demand for magnetically-attached clip-on sunglasses.

The magnets have been positioned in a variety of different locations on the frame of magnetically-attachable clip-on sunglasses. The number of the magnets also varies according to the different types of magnetically-attachable clip-on sunglasses. The more magnets and the more locations of those magnets on the clip-on sunglasses limit the possibilities for attaching the clip-on sunglasses to conventional eyeglasses, because a corresponding magnetically attractable structure must be located on the frame structure of the conventional eyeglasses to assure that the magnets of the clip-on sunglasses will securely attach to the frame structure of the conventional eyeglasses. If the magnets are not positioned at the appropriate location to interact with the frame structure of the conventional eyeglasses, or if multiple magnets are needed to obtain the necessary force to hold the clip-on sunglasses firmly to the frame structure of the conventional eyeglasses, the magnetic connection arrangement may appear bulky, may not locate the colored lenses of the clip-on sunglasses in close adjacency to the clear lenses of the conventional eyeglasses, may not permit the colored lenses of the clip-on sunglasses to assume the same shape as the clear lenses of the conventional eyeglasses, and may otherwise generally diminish the style and appearance characteristics of the clip-on sunglasses, thereby making the clip-on sunglasses less appealing to the user.

One very effective magnetic attraction technique for attaching clip-on sunglasses to conventional eyeglasses involves the use of a magnetically attractable connection body attached to the bridge portion of the clip-on sunglasses frame structure. The bridge portion of the clip-on sunglasses frame structure extends between the bands of the frame structure which surround the colored lenses. The magnetically attractable connection body has a slot, and the slot is adapted to fit within and magnetically attract to a nose-bridge portion of the wire frame structure of conventional eyeglasses. The nose-bridge portion of the conventional eyeglasses frame structure extends across the wearer's nose and connects the bands which extend around the clear lenses of the conventional eyeglasses. With the magnetically attractable connection body of the clip-on sunglasses positioned over the nose-bridge portion of the metallic frame structure of conventional eyeglasses, the clip-on sunglasses are securely attached to the conventional eyeglasses. When attached in this matter, the colored lenses of the clip-on sunglasses are close to the clear lenses of the conventional eyeglasses, and do not appear to be attached to the conventional eyeglasses, creating the appearance that the clip-on sunglasses are almost an integral part of the conventional eyeglasses and contributing to the style and appeal of using the clip-on sunglasses.

The nose-bridge magnetically attractable connection body is particularly beneficial in allowing clip-on sunglasses to be used with wire frame conventional eyeglasses, because wire frame eyeglasses generally do not have sufficient mechanical structure to support mechanical clip-on attachments or do not have sufficient mechanical structure to permit many other types of magnetic clip-on sunglasses with magnets located in other positions to be effectively connected to wire frame eyeglasses. The nose-bridge magnetically attractable connection body also permits the colored lenses of the clip-on sunglasses to assume essentially the same shape as the lenses of the conventional eyeglasses.

Photochromatic lenses have been used in conventional eyeglasses to avoid the need for separate sunglasses and clip-on sunglasses. Photochromatic lenses respond to ultraviolet radiation present in intense natural sunlight to darken the color of the lenses. The darkened lenses simulate conventional sunglasses. Upon moving indoors or out of intense direct sunlight, the lack of ultraviolet radiation causes the photochromatic lenses to return to a clear condition.

While photochromatic lenses are generally very effective, they are not particularly effective when driving an automobile or otherwise operating a vehicle. When operating a vehicle, only a small amount of ultraviolet radiation penetrates into the cabin or compartment of the vehicle where the driver is located. Consequently, the photochromatic lenses do not darken sufficiently to provide adequate protection from intense sunlight for the operator's eyes. Consequently, users of photochromatic lenses are forced to use a separate pair of sunglasses when driving a vehicle, or to use clip-on sunglasses with their photochromatic eyeglasses in the same way that users of conventional eyeglasses use clip-on sunglasses. Users of photochromatic lenses have no need for conventional sunglasses or clip-on sunglasses when not operating the vehicle because the photochromatic response of the lenses provides the necessary eye-protective darkening effect in other intense-sunlight environments.

Using a separate pair of conventional sunglasses or clip-on sunglasses with photochromatic lenses is somewhat difficult because the user must keep track of the extra sunglasses or the clip-on sunglasses. Furthermore, many users of conventional clear-lens eyeglasses do not encounter a bright sunshine environment except when operating a vehicle. Keeping track of the separate conventional sunglasses or the clip-on sunglasses during those times when not operating a vehicle is inconvenient, especially since conventional sunglasses or clip-on sunglasses are used when operating a vehicle. Keeping track of and protecting clip-on sunglasses is more difficult, because they are smaller than conventional sunglasses, and they are more delicate and easier to damage than conventional eyeglasses or sunglasses.

One known technique of making sunglasses and conventional eyeglasses readily available to vehicle operators is to attach a pouch or case within which to keep the sunglasses or eyeglasses to a sun visor of the vehicle. In this matter, the sunglasses or eyeglasses are immediately accessible whenever the vehicle is operated. However, the driver must open the case or pouch to retrieve the sunglasses or eyeglasses, and such manipulation may distract attention from operating the vehicle. Repeatedly accessing the pouch or case may be particularly bothersome on partially overcast days where the vehicle moves through alternating areas of shade and intense sunlight. Connecting the clip-on sunglasses to the conventional eyeglasses or substituting conventional sunglasses for conventional eyeglasses when encountering areas of intense sunlight, and then disconnecting the clip-on sunglasses or making the eyewear substitution in areas of shade, can be very distracting to the operation of the vehicle since most operators attempt to accomplish such transitions in eyewear while continuing to operate the vehicle. Furthermore, the tendency is not to replace the previously-used eyewear in a case or pouch, because of the distraction of accessing the case or pouch while operating the vehicle. Instead, the vehicle operator will typically lay down the previously-used eyewear on the seat or instrument panel of the vehicle, and thereafter may have difficulty remembering or locating where the eyewear was temporarily placed.

While a case or pouch attached to a vehicle sun visor may be used to hold clip-on sunglasses, the somewhat fragile nature of many of the clip-on sunglasses will not permit repeatedly sliding the clip-on sunglasses into and out of a pouch or case without risking bending, distorting, damaging or breaking the clip-on sunglasses. Furthermore, the relatively small size of the more stylish types of clip-on sunglasses makes them difficult to locate within the typical pouch or case, since a typical case or pouch has a size that is large enough for containing full-size sunglasses or eyeglasses. The small size of the clip-on sunglasses may result in the stately inserting full-size sunglasses or eyeglasses into the same case or pouch as the clip-on sunglasses, thereby damaging or bending the clip-on sunglasses or scratching the lenses of the conventional eyeglasses or clip-on sunglasses.

The consideration and recognition of these and other background factors have led to the present invention.

SUMMARY OF THE INVENTION

The present invention provides an effective and readily accessible apparatus and method for retaining clip-on sunglasses to the sun visor of a vehicle. The clip-on sunglasses are retained in a conveniently accessible manner. Access to the clip-on sunglasses when needed is immediate, and the clip-on sunglasses are retained in a consistent, known location when not in use to thereby facilitate immediately locating the clip-on sunglasses when the need arises. The clip-on sunglasses are visually displayed to immediately indicate their availability, making it unnecessary for the vehicle operator to open pouches or cases to attempt to locate the clip-on sunglasses. The clip-on sunglasses are easily connected to and disconnected from their retained position, to allow the vehicle operator to quickly access the clip-on sunglasses when needed and to quickly replace the clip-on sunglasses when eye protection is no longer needed or when operation of the vehicle is terminated. The clip-on sunglasses are retained separately apart from other eyewear. Consequently, the clip-on sunglasses are not likely to be bent, broken, distorted, scratched or otherwise damaged by contact with other eyewear. The effectiveness of retaining and accessing the clip-on sunglasses does not diminish the possibility of also retaining conventional eyeglasses, which the vehicle operator may wish to use as driving eyeglasses in conjunction with the clip-on sunglasses, or as alternatives to the clip-on sunglasses. The present invention is particularly useful in conjunction with the use of photochromatic lenses, because the ready accessibility and retention of the clip-on sunglasses makes them easily usable when operating a vehicle, which is the most likely circumstance or environment where additional eye protection is required for users of photochromatic lenses.

In accordance with these and other improvements and features, the aspects of the invention involve an apparatus and a method for retaining and accessing clip-on sunglasses on a vehicle sun visor. The clip-on sunglasses include a connection body to connect the clip-on sunglasses to conventional eyeglasses.

One aspect of the apparatus involves a pouch having an exterior surface and an interior within which to contain conventional eyeglasses. An attachment attaches the pouch to the sun visor, and a retainer is connected to the pouch. The retainer connects with the connection body of the clip-on sunglasses and retains the clip-on sunglasses at the exterior surface of the pouch for ready access by the vehicle operator. The connection body of the clip-on sunglasses and retainer both preferably comprise magnetically attractable material to retain the clip-on sunglasses to the retainer by magnetic attraction. The magnetic attraction may be overcome to disconnect the clip-on sunglasses. More preferably, the connection body includes a slot, the retainer includes a flange which extends from the pouch, and the slot receives the flange to retain the clip-on sunglasses. Still more preferably, the retainer includes a base from which the flange extends at an angle relative to the base, the pouch has a wall which comprises an exterior layer and an interior layer, the base is located between the interior and the exterior layers, and the flange extends through an opening in the exterior layer. Access to the interior of the pouch to insert and remove conventional eyeglasses can occur while the pouch is attached to the sun visor and while the clip-on sunglasses are retained to the pouch. The pouch is preferably attached to the sun visor by a resilient clip.

Another aspect of the apparatus involves a retainer having a flange which is to be received within a slot in a connection body of clip-on sunglasses. The slot is normally intended to receive a nose-bridge portion of a frame structure of eyeglasses to retain the clip-on sunglasses to the eyeglasses. The retainer is attached to a sun visor with the flange extending away from the sun visor to permit the slot to be placed over the flange and thereby retain the clip-on sunglasses from the sun visor by the retainer. The connection body and the flange are preferably magnetically attached to one another.

One aspect of the method involves attaching to the sun visor a pouch having an exterior surface and an interior within which to contain conventional eyeglasses, connecting the clip-on sunglasses to the exterior surface of the pouch to retain the clip-on sunglasses to the pouch while the pouch is attached to the sun visor, and selectively disconnecting the clip-on sunglasses from the exterior surface of the pouch to access use of the clip-on sunglasses. Again, the clip-on sunglasses are preferably connected by magnetic attraction, and the clip-on sunglasses are disconnected by manually overcoming the magnetic attraction without detaching the pouch from the sun visor.

Another aspect of the method involves attaching a retainer having a flange to the sun visor with the flange extending away from the sun visor, positioning the clip-on sunglasses to insert a flange of the retainer within a slot of a connection body of the clip-on sunglasses, preferably by magnetic attraction.

A more complete appreciation of the scope of the invention and the manner in which it achieves the above-noted and other improvements can be obtained by reference to the following detailed description of presently preferred embodiments taken in connection with the accompanying drawings, which are briefly summarized below, and by reference to the appended claims.

DETAILED DESCRIPTION

Figure 1:
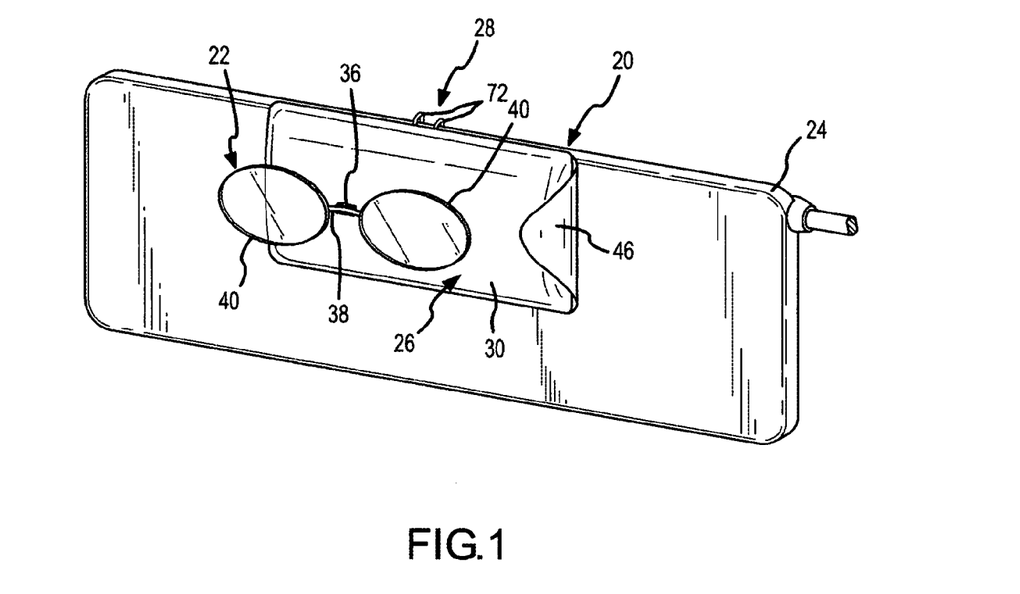
FIG. 1 is a perspective view of a device attached to a sun visor of a vehicle for retaining and accessing clip-on sunglasses, which embodies the present invention.
Figure 2:
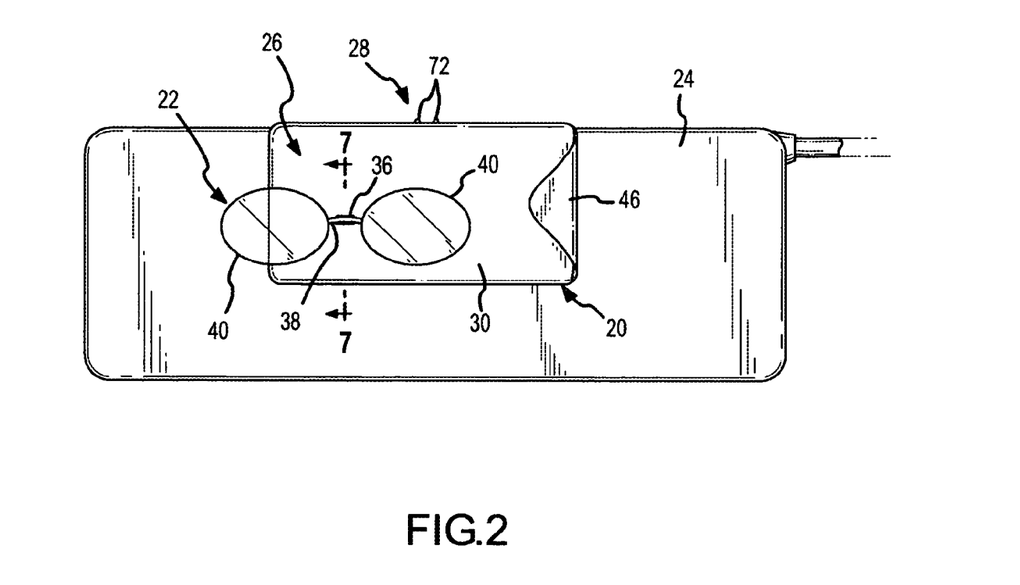
FIG. 2 is a front side elevational view of FIG. 1.
Figure 3:
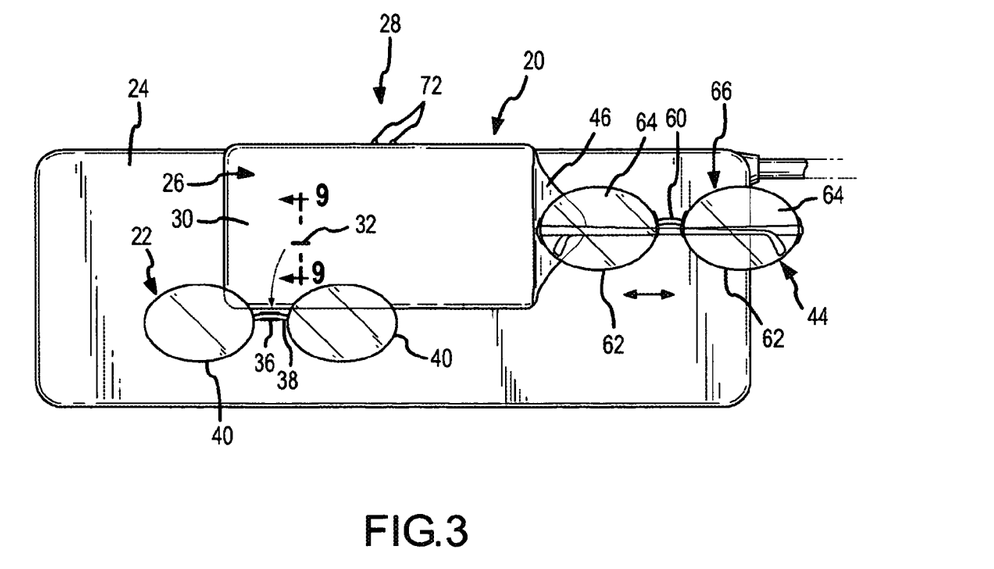
FIG. 3 is a view similar to FIG. 2, illustrating removal of the clip-on sunglasses from the retaining and accessing device, and also showing insertion and removal of conventional eyeglasses from the device while remaining attached to the sun visor.
Figure 6:
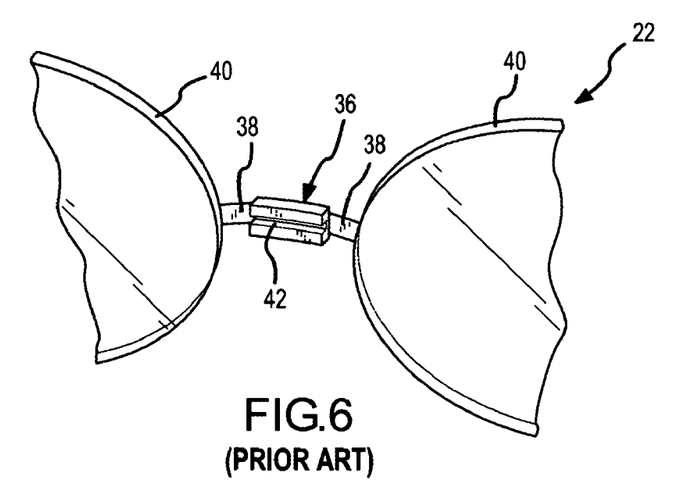
FIG. 6 is a rear partial perspective view of prior art clip-on sunglasses shown in FIGS. 1, 2 and 3, illustrating details of a bridge portion of their frame structure having a magnetically attractable connection body.
Figure 7:
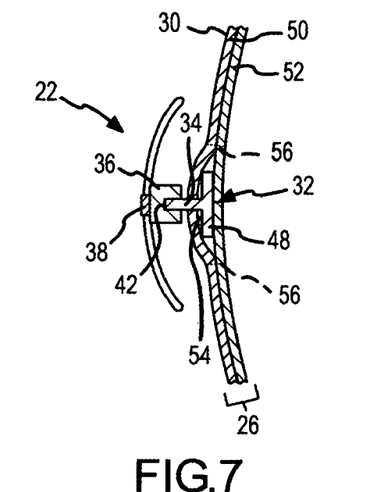
FIG. 7 is a partial section view taken substantially in the plane line 7—7 of FIG. 2, showing the interconnection of the retainer shown in FIG. 5 with the connection body of the bridge portion of the clip-on sunglasses shown in FIG. 6.
Figure 8:
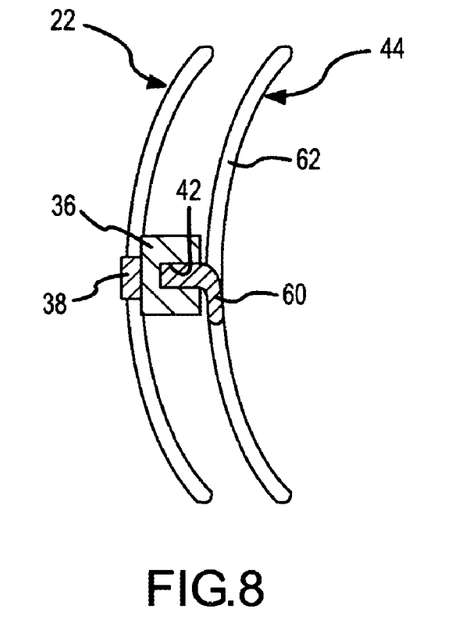
FIG. 8 is a partial section view of the connection body of the bridge portion of the clip-on sunglasses shown in FIG. 6, connected to a nose-bridge portion of conventional eyeglasses showed in FIG. 3.
Figure 9:
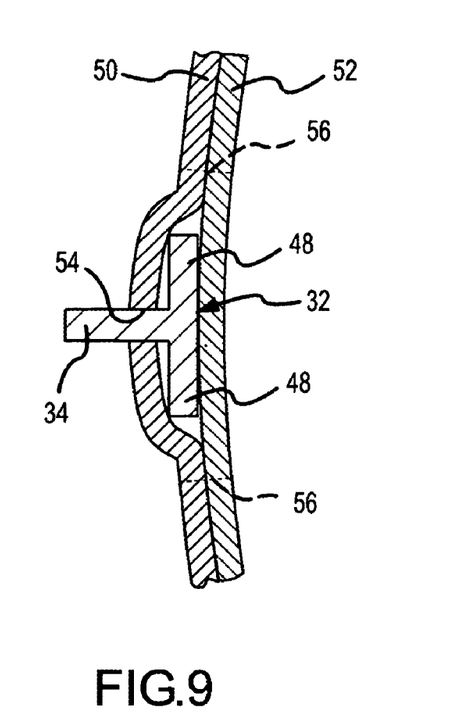
FIG. 9 is an enlarged section view taken substantially in the plane line 9—9 of FIG. 3.

A device 20 for retaining clip-on sunglasses 22 to a conventional sun visor 24 in accordance with the present invention, is shown in FIGS. 1–4. The sun visor 24 is part of a conventional vehicle (not shown). The device 20 preferably includes a conventional eyeglasses case or pouch 26 which is attached to the sun visor 24 by a conventional mechanical attachment clip 28. The clip-on sunglasses 22 are accessibly and removably retained at an external outward facing exterior surface 30 of the pouch 26, when the pouch 26 is connected to the sun visor 24 with the attachment clip 28. A magnetically attractable retainer 32 (FIG. 5) is connected to the pouch 26, and a flange portion 34 of the retainer 32 extends outward from the external pouch surface 30 (FIGS. 3, 7 and 9). The clip-on sunglasses 22 includes a magnetically attractable connection body 36 connected to a bridge portion 38 of a frame structure 40 (FIGS. 6, 7 and 8). The connection body 36 includes a slot 42 (FIG. 6) which receives the flange portion 34 of the retainer 32, thereby magnetically connecting the clip-on sunglasses 22 to the device 20 (FIG. 7) and to the sun visor 24.

With the clip-on sunglasses 22 connected to the device 20, the clip-on sunglasses 22 are readily accessible to the operator of the vehicle of which the sun visor 24 is a part. The vehicle operator can easily observe the presence of the clip-on sunglasses 22. The clip-on sunglasses 22 are easily removed from the pouch 26, as understood from FIG. 3, to attach them to the operator's conventional eyeglasses. Removing the clip-on sunglasses 22 from the device 20 is accomplished by grasping the clip-on sunglasses 22 and separating them from the pouch 26 and the retainer 32. The vehicle operator does not need to open any compartments, pouches or cases to obtain access to the clip-on sunglasses 22. Moreover, the operator does not need to search for the clip-on sunglasses, because their presence or absence is readily observable by viewing the exterior of the pouch 26. When the user is finished using the clip-on sunglasses, they are easily reattached to the pouch 26 by positioning the slot 42 of the connection body 36 over the flange portion 34 of the retainer 32, without the necessity to open any compartments, pouches or cases.

Although it is not necessary to retain the retainer 32 to the sun visor 24 through the use of the intermediary pouch 26, the use of the pouch 26 provides additional improvements. As shown in FIG. 3, the pouch 26 may be used to contain conventional eyeglasses 44. A flap 46 folds over an open end of the pouch 26 to confine the eyeglasses 44 within the interior of the pouch 26. The flap 46 is movable to expose the interior of the pouch 26 to allow the eyeglasses 44 to be removed from the pouch and to be inserted into the pouch. Including the pouch 26 as part of the device 20 also allows the vehicle operator to access the conventional eyeglasses 44 if desired, as would be the case when the operator requires conventional eyeglasses only when operating the vehicle. The interior of the pouch 26 is also available to contain and provide access to conventional sunglasses, should those conventional sunglasses be desired as an alternative to using the clip-on sunglasses 22.

Figure 5:
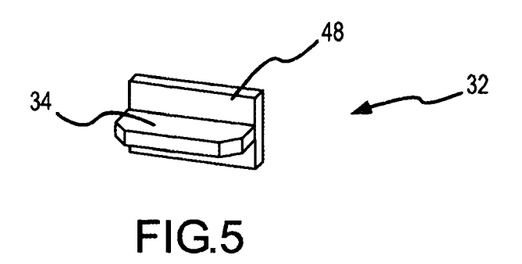
FIG. 5 is a front perspective view of a magnetically attractable retainer of the device shown in FIGS. 1, 2 and 3.

The retainer 32 is preferably formed in a "T" shaped cross-sectional configuration, as shown in FIGS. 5, 7 and 9. The flange portion 34 extends at a perpendicular angle outward from a base portion 48 of the retainer 32. The base portion 48 is captured between an exterior layer 50 and an interior layer 52 of flexible material which are used to form sides of the pouch 26. In general, the exterior layer 50 will be somewhat more stiff and resistant to exterior forces that might be inadvertently applied to the pouch 26, while the interior layer 52 will be of softer material to protect the lenses of the eyeglasses 44 when inserted within the pouch 26. Typically, the exterior layer 50 and the interior layer 52 are joined together by sewing or by adhesive.

The retainer 32 is attached to the pouch 26 by inserting the flange portion 34 through a small slit 54 formed in the exterior layer 50. The base portion 48 of the retainer 32 is positioned to contact the exterior layer 50 before the interior layer 52 is placed adjacent to the exterior layer 50 when constructing the pouch 26. The retainer 32 is held in this position by thread 56 which are sewn through the layers 50 and 52 at a position which is slightly to the exterior periphery of the base portion 48. Alternatively or in addition, an adhesive may hold the exterior and interior layers 50 and 52 together, which also holds the retainer 32 in place.

With the retainer 32 assembled to the pouch 26 in the manner described, most of the flange portion 34 projects outwardly from the exterior surface 30 of the exterior layer 50, as shown in FIGS. 7 and 9. The amount of forward projection of the flange portion 34 is sufficient to allow the slot 42 of the connection body 36 to receive the forward portion of the flange portion 34, when the clip-on sunglasses 22 are attached to the retainer 32 as shown in FIG. 7. At least the flange portion 34, and preferably the entire retainer 32, is formed from magnetically attractable material, so that the connection body 36 is magnetically attracted to the flange portion 34 to hold the clip-on sunglasses 22 to the retainer 32. The amount of magnetic attraction is sufficient to maintain the clip-on sunglasses 32 connected to the retainer 32 of the pouch 26 during normal movement and jostling of the vehicle, but is not so strong as to substantially impede manually disconnecting the clip-on sunglasses 22 from the pouch.

Although retainers could be attached to the exterior surface 30 of the pouch 26 in a variety of different locations to complement the location of magnetic attraction bodies on a variety of different types of clip-on sunglasses, the use of the single retainer 32 is of particular benefit for interacting with the connection body 36 connected to the bridge portion 38 of the conventional frame structure of 40 of the clip-on sunglasses 22. Clip-on sunglasses 22 of the type which utilize the connection body 36 connected to the bridge portion 38 are one of the most convenient and popular types of magnetically-attached clip-on sunglasses. The relatively minimal amount of additional structure in the form of the connection body 36 allows the clip-on sunglasses 22 to be effectively attached only to a nose-bridge portion 60 of the conventional wire frame eyeglasses 44 without the use of additional magnets on either the clip-on sunglasses 22 or the eyeglasses 44.

As shown in FIG. 3, the nose-bridge portion 60 extends between band portions 62 which encircle lenses 64 of the eyeglasses 44. The nose bridge portion 60 and the band portions 64 form a substantial portion of a wire frame structure 66 of the eyeglasses 44. In the wire frame eyeglasses 44, the nose-bridge portion 60 is typically formed from steel, a ferromagnetic material which is magnetically attractable. The slot 42 in the connection body 36 of the clip-on sunglasses 22 receives the nose-bridge portion 60 of the eyeglasses 44, as shown in FIG. 8, to securely retain the clip-on sunglasses 22 to the eyeglasses 44 with the lenses of the clip-on sunglasses 22 located closely adjacent to the lenses 64 of the eyeglasses 44. The close attachment of the clip-on sunglasses causes their colored lenses to assume an almost-integral appearance with the conventional eyeglasses. No additional magnets or attachments are required at other locations on the clip-on sunglasses 22 or on the frame structure 66 of the eyeglasses 44 to attach the clip-on sunglasses 22 to the eyeglasses 44.

Figure 4:
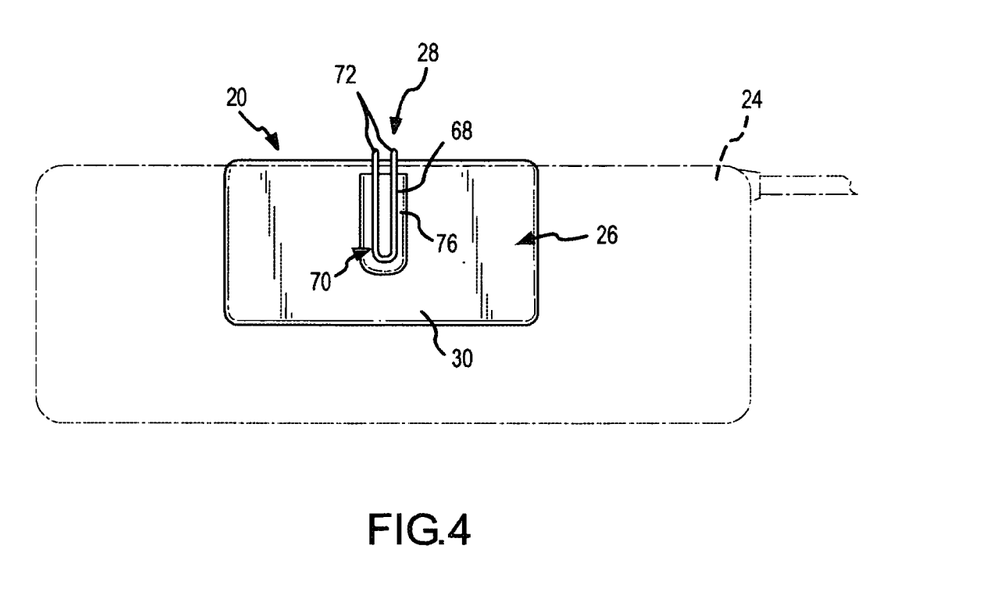
FIG. 4 is a rear side elevational view of FIG. 2 taken from the opposite side of the sun visor shown in FIGS. 1 and 2, with the sun visor shown in phantom, and further illustrating connection of the device to the sun visor.
Figure 10:
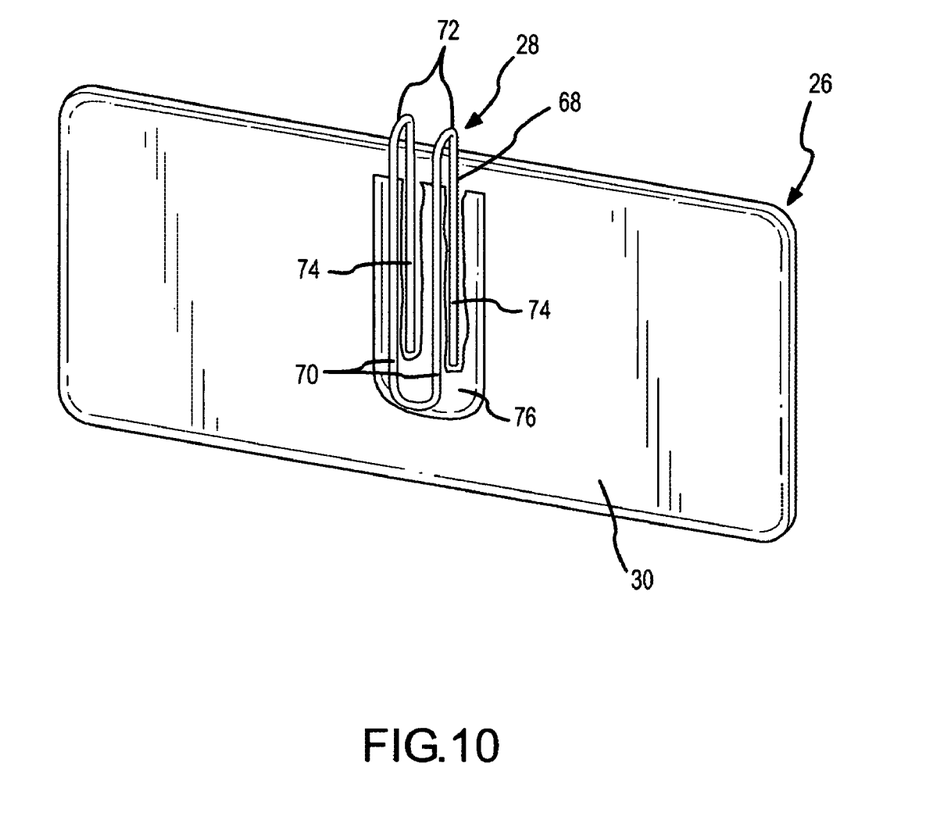
FIG. 10 is an enlarged partial perspective view of the device shown in FIG. 3, with a portion broken out to show details of an attachment clip.

The mechanical attachment clip 28, which connects the pouch 26 to the sun visor 24, is formed by a resilient spring wire 68 which is bent into a resilient arm portion 70, a curved middle portion 72, and a terminal portion 74, as shown in FIGS. 4 and 10. The resilient arm portion 70 and the terminal portion 74 extend transversely relative to a longitudinal dimension of the pouch 26, when the longitudinal dimension extends parallel to the direction that the eyeglasses 44 are inserted into and removed from the pouch (FIG. 3). The terminal portion 74 is located and confined in a pocket 76 which is sewn to the backside of the exterior surface 30 of the pouch 26. The terminal portion 74 is permanently confined in the pocket 72, as a result of sewing the pocket 76 to the pouch 26 or as a result of using adhesive to hold the terminal portion 74 and the pocket 76 to the pouch 26. The upper end (as shown) of the terminal portion 74 extends slightly above the height of the upper longitudinal edge of the pouch 26, and the middle portion 72 continues above that point in a rearward 180 degree turn which ends at approximately the upper longitudinal edge of the pouch 26. The resilient arm portion 70 extends from the curved middle portion 72 downward in a direction generally parallel to the extension of the terminal portion 74. The resiliency of the spring wire 68, and particularly the curvature of the middle portion 72, causes the resilient arm portion 70 to be normally biased closely adjacent to the pocket 76 and the terminal portion 74 at the backside of the exterior surface 30 which contacts the pouch 26.

The pouch 26 is connected to the sun visor 24 by inserting an upper edge of the sun visor 24 between the resilient arm portion 74 and the backside exterior surface 30 of the pouch 26. Since the resilient arm 70 and the terminal portion 74 are resiliently biased toward one another, retention force is applied by the attachment clip 28 to hold the pouch 26 firmly against the sun visor 24. The amount of retention force is sufficient to hold the pouch 26 in place when the clip-on sunglasses 22 are removed from their attachment to the retainer 32, as shown in FIG. 3. The amount of retention force is also sufficient to hold the pouch 26 in place when the flap 46 is opened and the conventional eyeglasses 44 are inserted into or are removed from the interior of the pouch 26. The amount of retention force is sufficient to hold the pouch 26 in position on the sun visor 24 as the vehicle moves and is jostled during operation.

Although the retention of the clip-on sunglasses 22 to the pouch at the retainer 32 is accomplished by magnetic attraction of the retainer 32 to the connection body 36, suitable non-magnetically attractable mechanical arrangements could also be used for attaching the sunglasses to the exterior of the pouch 26. Similarly, in those circumstances where a pouch 26 is not used, the clip-on sunglasses 22 could be attached magnetically to a retainer 32 which is directly connected to the sun visor 24 or which is connected to the sun visor 24 by an attachment clip of its own.

In the manner described, the clip-on sunglasses 22 are retained on the sun visor 24 of the vehicle in a readily accessible position for use by the vehicle operator. The location where the clip-on sunglasses are retained is immediately where they are most likely to be needed by the vehicle operator. The presence or absence of the clip-on sunglasses is readily apparent by visual observation, unlike the situation where closed containers are used to house sunglasses and other eyeglasses. Such closed containers require the user to open the container to gain access to its contents and to determine whether the sunglasses or eyeglasses are present within the closed container. The convenient location and easy retention of the clip-on sunglasses encourages them to be returned to their intended retention position on the sun visor after use, and discourages absent-minded and inadvertent placement of the clip-on sunglasses in some location which will later require searching to locate. The operator of the vehicle can easily switch between using the clip-on sunglasses and not using them, according to the intensity of the sunlight encountered when operating the vehicle.

The use of the pouch allows conventional eyeglasses, such as driving glasses, or other sunglasses to be used in connection with the clip-on sunglasses or as an alternative to the clip-on sunglasses. For those individuals who wear eyeglasses with photochromatic lenses, the clip-on sunglasses are readily accessible to be used with the photochromatic eyeglasses when operating the vehicle from a cabin or interior location where the ultraviolet radiation from the outside sunlight is insufficient to cause the photochromatic lenses to darken. When the operator leaves the automobile, the clip-on sunglasses are easily stored and retained on the sun visor at the location where they will be most needed when the vehicle is next operated. Many other advantages and improvements will be recognized from use of the present invention.

A presently preferred embodiment of the present invention and many of its improvements have been described with a degree of particularity. This description is a preferred example of implementing the invention, and is not necessarily intended to limit the scope of the invention. The scope of the invention is defined by the following claims.

The invention claimed is:

1. Apparatus for retaining and accessing clip-on sunglasses on a vehicle sun visor, the clip-on sunglasses including a connection body to connect the clip-on sunglasses to eyeglasses, the apparatus comprising:
    a pouch having an exterior surface and an interior within which to contain eyeglasses;
    an attachment to attach the pouch to the sun visor; and
    a retainer connected to the pouch to connect with the connection body of the clip-on sunglasses and retain the clip-on sunglasses at the exterior surface of the pouch for access.

2. Apparatus as defined in claim 1, wherein the connection body of the clip-on sunglasses comprises magnetically attractable material; and wherein:
    the retainer comprises magnetically attractable material; and
    the retainer and the connection body connect by magnetic attraction.

3. Apparatus as defined in claim 2, wherein:
    the magnetic attraction of the retainer and the connection body permits manual separation of the connection body from the retainer.

4. Apparatus as defined in claim 2, wherein the connection body includes a slot, and wherein:
    the retainer includes a flange which extends outward from the exterior surface of the pouch; and
    the slot within the connection body receives the flange of the retainer to retain the clip-on sunglasses.

5. Apparatus as defined in claim 4, wherein the slot in the connection body is normally intended to receive a nose-bridge portion of a frame structure of eyeglasses to retain the clip-on sunglasses to the eyeglasses.

6. Apparatus as defined in claim 4, wherein:
    the retainer includes a base from which the flange extends at an angle relative to the base;
    the pouch has a wall which comprises an exterior layer and an interior layer, the interior layer is adjacent to the interior of the pouch and the exterior layer is adjacent to the exterior surface of the pouch;
    the base of the retainer is located between the interior and the exterior layers; and
    the flange of the retainer extends through an opening in the exterior layer.

7. Apparatus as defined in claim 1, wherein:
    the attachment permits access to the interior of the pouch to insert eyeglasses into and remove eyeglasses from the interior of the pouch when the pouch is attached to the sun visor and while the clip-on sunglasses are retained to the exterior of the pouch.

8. Apparatus as defined in claim 7, wherein the attachment further comprises:
    a clip connected to the pouch and having a resilient portion which extends from the exterior of the pouch to hold a portion of the sun visor between the resilient portion in the pouch.

9. Apparatus as defined in claim 1, wherein:
    the interaction of the retainer and the connection body permits separation of the clip-on sunglasses from the pouch without separation of the pouch from the sun visor.

10. Apparatus for retaining and accessing clip-on sunglasses on a vehicle sun visor, the clip-on sunglasses including a connection body having a slot which is normally intended to receive a nose-bridge portion of a frame structure of eyeglasses to retain the clip-on sunglasses to the eyeglasses, the apparatus comprising:
    a retainer having a flange which is to be received within the slot of the connection body to retain the clip-on sunglasses to the retainer; and
    an attachment which attaches the retainer to a sun visor with the flange extending away from the sun visor in a position to be inserted within the slot of the connection body to retain the clip-on sunglasses from the retainer attached to the sun visor.

11. Apparatus as defined in claim 10, wherein the connection body of the clip-on sunglasses comprises magnetically attractable material; and wherein:
    the flange of the retainer comprises magnetically attractable material; and
    the flange of the retainer is retained within the slot of the connection body by magnetic attraction.

12. Apparatus as defined in claim 11, wherein:
    the magnetic attraction of the flange of the retainer within the slot of the connection body permits manual separation of the connection body from the retainer.

13. A method of retaining and accessing clip-on sunglasses on a vehicle sun visor, comprising:
    attaching a pouch to the sun visor, the pouch having an exterior surface and an interior within which to contain eyeglasses;
    connecting the clip-on sunglasses to the exterior surface of the pouch to retain the clip-on sunglasses to the pouch while the pouch is attached to the sun visor; and
    selectively disconnecting the clip-on sunglasses from the exterior surface of the pouch to access use of the clip-on sunglasses.

14. A method as defined in claim 13, further comprising:
connecting the clip-on sunglasses to the exterior of the pouch with magnetic attraction; and
disconnecting the clip-on sunglasses from the exterior surface of the pouch by manually overcoming the magnetic attraction without detaching the pouch from the sun visor.

15. A method as defined in claim 14, wherein the clip-on sunglasses include a connection body having a slot within which normally receives a nose-bridge portion of a frame structure of eyeglasses to retain the clip-on sunglasses to the eyeglasses, the method further comprising:
extending a flange outward from the exterior surface of the pouch;
inserting the flange within the slot of the connection body; and
connecting the clip-on sunglasses to the pouch by magnetic attraction between the flange and the connection body while the flange is inserted within the slot.

16. A method as defined in claim 15, further comprising:
extending a base from the flange at an angle relative to the flange;
forming the pouch with a wall having an exterior layer and an interior layer;
locating the base between the interior and the exterior layers; and
extending the flange through an opening in the exterior layer.

17. A method as defined in claim 13, further comprising:
inserting eyeglasses into the interior of the pouch and removing eyeglasses from the interior of the pouch without detaching the pouch from the sun visor and while the clip-on sunglasses are connected to the exterior of the pouch.

18. A method as defined in claim 17, further comprising:
connecting to the pouch to the sun visor by holding a portion of the sun visor within a resilient portion of a clip attached to the exterior surface of the pouch.

19. A method of retaining and accessing clip-on sunglasses on a vehicle sun visor, the clip-on sunglasses including a connection body having a slot within which a nose-bridge portion of a frame structure of eyeglasses is normally received to retain the clip-on sunglasses to the eyeglasses, the method comprising:
attaching a retainer having a flange to the sun visor with the flange extending away from the sun visor;
positioning the clip-on sunglasses to insert the flange within the slot of the connection body; and
connecting the clip-on sunglasses to the retainer by maintaining the flange within the slot of the connection body.

20. A method as defined in claim 19, further comprising:
maintaining the flange within the slot by magnetic attraction.

21. A method as defined in claim 20, further comprising:
selectively disconnecting the clip-on sunglasses from the retainer by manually overcoming the magnetic attraction to separate the flange from within the slot.

22. A method as defined in claim 19, further comprising:
attaching the retainer to an exterior surface of a pouch used for containing eyeglasses; and
attaching the pouch to the sun visor.

* * * * *